US012785816B2

(12) United States Patent
Lefevre et al.

(10) Patent No.: US 12,785,816 B2
(45) Date of Patent: Nov. 3, 2026

(54) METHOD AND APPARATUS FOR EQUALIZATION IN PON

(71) Applicant: Nokia Solutions and Networks Oy, Espoo (FI)

(72) Inventors: Yannick Lefevre, Heverlee (BE); Michiel Verplaetse, Nazareth (BE); Wouter Lanneer, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 259 days.

(21) Appl. No.: 18/610,432

(22) Filed: Mar. 20, 2024

(65) Prior Publication Data

US 2024/0322913 A1 Sep. 26, 2024

(30) Foreign Application Priority Data

Mar. 22, 2023 (EP) .................................... 23163505

(51) Int. Cl.

| | |
|---|---|
| ***H04J 14/00*** | (2006.01) |
| ***H04B 10/079*** | (2013.01) |
| ***H04B 10/27*** | (2013.01) |
| ***H04B 10/69*** | (2013.01) |

(52) U.S. Cl.

CPC ..... *H04B 10/6971* (2013.01); *H04B 10/0795* (2013.01); *H04B 10/27* (2013.01)

(58) Field of Classification Search

CPC ....................... H04B 10/6971; H04B 10/0795; H04B 10/27; H04B 10/40; H04B 10/2507; H04B 10/697; H04B 10/6972; H04B 10/6932; H04B 10/616; H04J 14/0245; H04J 14/0246; H04J 14/0278

USPC ........ 398/66, 67, 68, 69, 70, 71, 72, 79, 33, 398/38, 25, 26, 27, 158, 159, 135, 136, 398/202, 208, 209, 147, 81; 375/232, 375/233, 229, 316, 340, 354

See application file for complete search history.

(56) References Cited

U.S. PATENT DOCUMENTS

| | | | | |
|---|---|---|---|---|
| 8,503,891 | B2 * | 8/2013 | Mashimo | H04L 25/0262 398/58 |
| 10,404,496 | B1 * | 9/2019 | Azenkot | H04B 10/6165 |
| 11,146,428 | B2 * | 10/2021 | Sasaki | H04L 25/03057 |
| 12,334,986 | B2 * | 6/2025 | Zeydel | H04B 10/60 |

* cited by examiner

*Primary Examiner* — Hanh Phan

(74) *Attorney, Agent, or Firm* — Harness, Dickey & Pierce, P.L.C.

(57) ABSTRACT

The present invention discloses an apparatus, comprising means for: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

15 Claims, 3 Drawing Sheets

METHOD AND APPARATUS FOR EQUALIZATION IN PON

CROSS-REFERENCE TO RELATED APPLICATIONS

This application claims priority to and the benefit of European Patent Application No. 23163505.3 filed on Mar. 22, 2023, the entire contents of each of which are incorporated herein by reference.

FIELD OF THE INVENTION

Various example embodiments relate to optical networks, specifically to equalization in passive optical networks (PON).

BACKGROUND

In 2021, the Telecommunication Standardization sector of the International Telecommunication Union (ITU-T) standardization body published the G.9804 standard for 50G PON. This standard combines a 50G line rate in downstream (DS), with 12.5G and 25G in upstream (US). In September 2022, also a 50G US line-rate was consented for G.9804.

For a 50G multi-rate Optical Line Terminal (OLT) receiver, the rate can vary from burst to burst. Such a 50G receiver has a receiver chain (including for example avalanche photo-diode, APD, trans-impedance amplifier, TIA, clock and data recovery, CDR, and equalizer), that have been designed and optimized for 50G reception. When receiving 25G or 12.5G bursts there will basically be excess bandwidth present in the receive chain, which will cause unnecessary high-frequency noise to be captured, which leads to a degradation in the sensitivity for these rates.

Furthermore, in current PON systems, operation is guaranteed for a certain minimal receive power or sensitivity. It is however possible that, during operation, an Optical Network Unit (ONU) is pushed beyond sensitivity by unforeseen circumstances. Such circumstances include for instance, fiber pulls or bends, dirty or faulty connectors, or excess heating of the ONU or OLT. Due to such circumstances, an ONU that is operating at the 50G sensitivity might no longer be able to receive and decode the 50G signal. In today's PON system, the ONU would go out of service, no on-line debugging would be possible, and the operator would have to send out an urgent repair.

The idea of a protection mode is to fall back to a mode that operates at a reduced rate, but offers an improved sensitivity. As such a fall-back protection mode, 25G operation is considered. For instance, in DS, a mixed modulation scheme that combines 25G with 50G could be used, in which the faulty ONU could use the 25G signal part.

To improve the reception of upstream bursts with different rates from different ONUs, and to make a fall-back protection mode in downstream direction possible, it requires a dynamic switching from 50G to 25G reception with adequate performance and with a limited or even no interruption of service.

Such multi-rate scenarios where the OLT or ONU needs to able to receive multiple rate signals from the same ONU or OLT for upstream/downstream respectively in combination with digital equalization has not been considered before in PON technologies.

For multi-rate burst-mode reception, one solution is to reduce the bandwidth of the analogue components (e.g., the TIA) when a lower-rate burst is received. However, the analogue bandwidth reduction that can be achieved is limited and not sufficient to fully filter out the excess high-frequency noise.

A prior art solution for using the equalizer in burst-mode reception, is to train equalizer coefficients per ONU. This is however not desirable in a multi-rate burst-mode context, as the adaptive equalizer training might take excess time for the 25G and 12.5G rates. Also training a 50G equalizer on a 12.5G and 25G signal will typically lead to a sub-optimal performance (can even lead to a degradation for some types of signals).

For the scenario of the fall-back protection mode in DS, a solution according to state of the art is to re-use the same 50G equalizer provisioned for standard 50G signalling. As the 50G equalizer inverts the PON channel, correct reception of the 25G signal is feasible. However, being trained for 50G signalling this equalizer will not give optimal performance for 25G signalling. The reason is that the 50G equalizer will also (and especially) boost frequencies higher than what is required for 25G reception. This will lead to a noise enhancement, and thus sensitivity impact for the 25G mode.

Another solution according to state of the art is to skip the equalizer block in case of 50G-to-25G fall-back scenario. However, as explained this will lead to unnecessary high-frequency noise, and thus an impact on the sensitivity.

SUMMARY OF THE INVENTION

Amongst others, it is an object of embodiments of the present disclosure to enable a dynamic switching for the equalizer based on different rates of the received signal at a receiver in the PON.

According to a first aspect of the invention, there is provided an apparatus, comprising means for performing: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to a second aspect of the invention, there is provided a method, comprising: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to a third aspect of the invention, there is provided a computer program comprising instructions for causing an apparatus to perform at least the following: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to a fourth aspect of the invention, there is provided an apparatus comprising at least one processor and at least one memory including computer program code, the at least one memory and the computer program code configured to with the at least one processor, cause the apparatus at least to perform: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to a fifth aspect of the invention, there is provided a non-transitory computer readable medium comprising program instructions for causing an apparatus to perform at least the following: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to a sixth aspect of the invention, there is provided a computer readable medium comprising program instructions for causing an apparatus to perform at least the following: determining a rate for a received signal in a passive optical network, PON; selecting, based on the determined rate, a set of coefficients for an equalizer from a plurality of predetermined sets of coefficients for the equalizer, wherein, the plurality of predetermined sets respectively corresponds to a plurality of rates; equalizing the received signal with the equalizer based on the selected set of coefficients, obtaining an equalized signal.

According to the example embodiments, the equalizer coefficients are selected based on the determined rate of the received signal, the same equalizer structure (or part of it) may be kept for different rates of reception. A dynamic switch in equalizer coefficients can be realized upon rate switching. While the performance, like Bit Error Rate (BER), and jitter tolerance, etc., of the received signals with different rates can be improved.

BRIEF DESCRIPTION OF THE FIGURES

For a More Complete Understanding of Example Embodiments of the Present Invention, Reference is Now Made to the Following Descriptions Taken in Connection with the Accompanying Drawings in which.

Same or similar reference numerals refer to same or similar parts or components.

DETAILED DESCRIPTION

Figure 1:
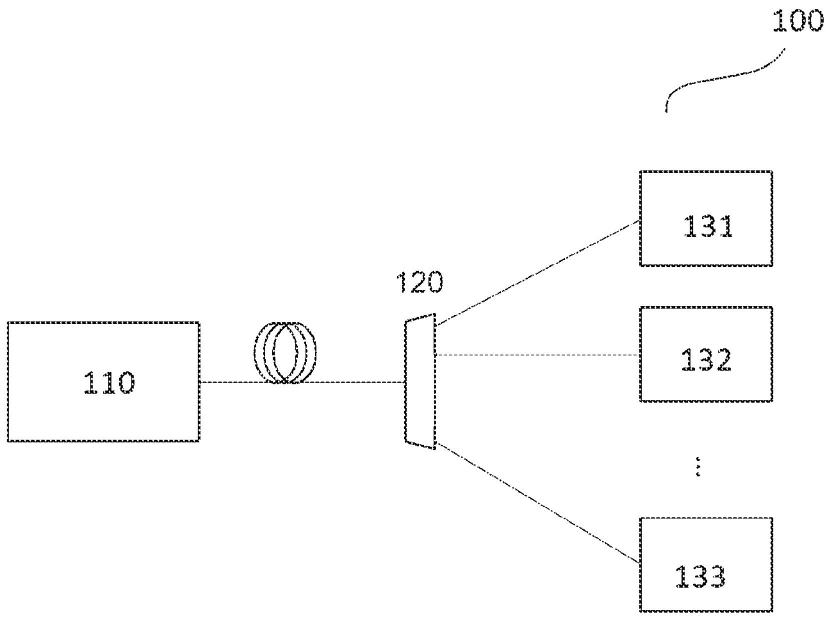
FIG. 1 shows a part of an exemplifying communication network in which examples of disclosed embodiments may be applied.

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. The sequence of method steps is not limited to the specific embodiments, the method steps may be performed in other possible sequence. Similarly, specific structural and functional details disclosed herein are merely representative for purposes of describing the embodiments. The invention described herein, however, may be embodied in many alternate forms and should not be construed as limited to only the embodiments set forth herein.

FIG. 1 shows a part of an exemplifying communication network in which examples of disclosed embodiments may be applied.

As shown in FIG. 1 in a passive optical network, PON, 100, an OLT 110 at the network side is used to connect to a plurality of ONUs 131, 132, . . . , 133 at the user side by means of an optical distribution network (ODN) or fiber plant 120 that contains optical fibers and splitters, but no active components. A skilled person shall understand the number of ONUs is not limited to the given example. The OLT 110 may be connected to for example up to 64 ONUs.

Most PON technologies such as G-PON, E-PON, and XG(S)-PON are time-division multiplexing (TDM) PON technologies, in which the fiber medium is shared in time between the different ONUs. In addition, time- and wavelength-division multiplexing (TWDM) PON technologies exist, such as next-generation NG-PON2, in which multiple TDM systems at different wavelength are stacked on the same PON system. Example embodiments apply to both TDM and TWDM PON systems.

In the following, various embodiments will be elaborated in the framework of 50G PON. A skilled person shall understand, as the technique advances, various embodiments may be implemented in the framework of other standards.

Figure 2:
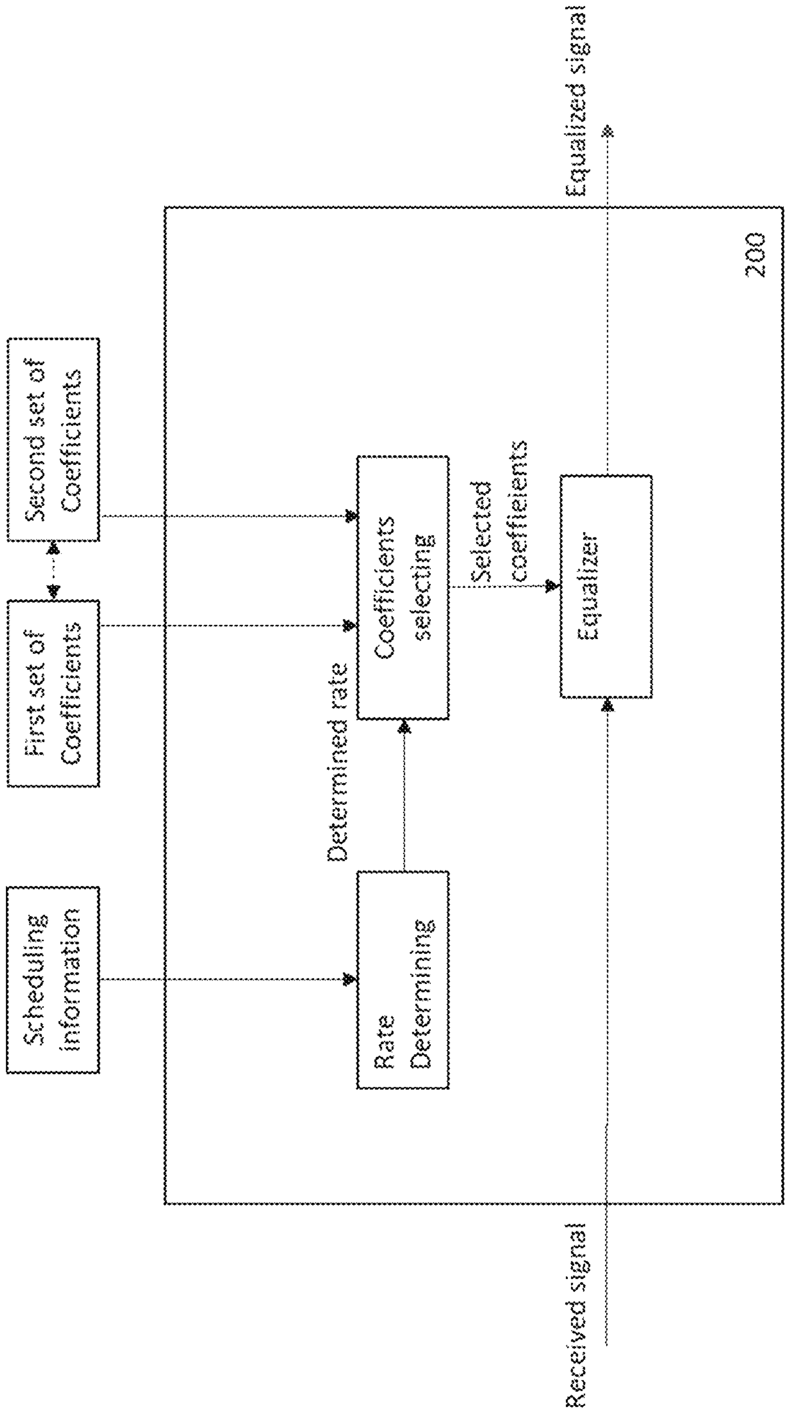
FIG. 2 shows an example block diagram of an apparatus according to an example embodiment.

FIG. 2 shows an example block diagram of an apparatus according to an example embodiment.

Various embodiments may be implemented at an OLT or an ONU in a PON, for example at the OLT 110, or at any one of the ONUs, for example, ONU 131, 132, . . . , 133 in FIG. 1.

In the embodiment shown in FIG. 2, the apparatus 200 receivers a signal in a PON, for example the PON 100 in FIG. 1. The received signal may be an upstream signal transmitted by one or more of the ONUs 131, 132, . . . , 133 in burst mode, or a downstream signal transmitted by the OLT 110.

The received signal may have different rates, selected from a plurality of predetermined operation rates. In one example, in case of a downstream signal, it may be a signal with full rate, for example 50G, or a signal with reduced rate, for example 25G for a fall-back protection mode. In another example, in case of an upstream signal, each burst may come from a respective ONU, which operates at a predetermined rate among a plurality of predetermined operation rates, for example 50G, 25G or 12.5G. In yet another example, the upstream signal from certain ONU may also have different rates from burst to burst. As the technique advances, the possible rates of the received signal may be different from the given examples.

Further, the apparatus 200 determines a rate for the received signal for example based on scheduling information as shown in the example of FIG. 2.

In the example shown in FIG. 2, the scheduling information may be provided by another entity to the apparatus 200. In another example, the scheduling information maybe preconfigured in the apparatus 200 or determined by the apparatus 200 itself.

Specifically, when the apparatus 200 is implemented in an ONU 131, 132, 133, the rate of the received signal may be determined based on a downstream scheduling information.

Specifically, the downstream scheduling information may be determined by the OLT for example based on the quality of the downstream channel to the respective ONU. The downstream scheduling information may comprise information related to the rate that the OLT has assigned for respective ONU, and/or rates corresponding to respective sections of a frame in which the OLT may transmit data intended for respective ONU. For example, the OLT may indicate to the ONUs where the sections of the assigned rate are placed in a frame.

For example, the OLT may assign to an ONU a certain rate, or a maximal rate, up to which the ONU can decode. Additionally or alternatively, the OLT may assign different rates for different sections of a frame. These assignments may be referred to as a downstream scheduling information. The downstream scheduling information may be provided by the OLT to the ONU, for example, in a PLOAM message, transmitted at a lower rate, for example 25G.

Referring to the example of FIG. 2, the apparatus 200 being implemented in the ONU 131 may obtain the downstream scheduling information from the OLT 110. Alternatively, the downstream scheduling information may also be preconfigured in the apparatus 200 for example when being implemented in the ONU 132.

Specifically, when the apparatus 200 is implemented in the OLT 110, the received signal may be a burst from the ONU 131, 132, 133. The rate of the received signal maybe determined based on a burst scheduling information. Specifically, the burst scheduling information may be determined by the OLT for example based on the configuration of each ONU, the capability of each ONU, and/or the quality of the upstream channel from each ONU. Specifically, the burst scheduling information may comprise information related to the rate and the ONU Identification corresponding to each expected incoming burst. For example, for typical upstream transmission, each burst is assigned to a respective ONU with a respective rate or, during activation of the ONUs, to a respective group of ONUs with a respective rate. These assignments may be stored at the OLT and used as the burst scheduling information. The rate of the received signal during a certain burst may be determined based on the rate assigned to the respective ONU for which the burst is scheduled.

Although in the example shown in FIG. 2, the rate of the received signal may be determined prior to the signal is received, for example based on scheduling information. In another example, the rate of the received signal maybe determined after the signal is received, for example based on signal characteristics of the received signal.

Further as shown in the FIG. 2, the determined rate is provided to a module for selecting coefficients.

The apparatus 200 selects, based on the determined rate, a set of coefficients for an equalizer from a plurality of predetermined sets of coefficients for the equalizer, wherein, the plurality of predetermined sets respectively corresponds to a plurality of rates.

As indicated in FIG. 2, the plurality of predetermined sets of coefficients for the equalizer may be provided by another entity to the apparatus 200. Alternatively, the plurality of predetermined sets of coefficients may be preconfigured in the apparatus 200.

For example, for each possible rate among the plurality of rates, a respective set of coefficients for the equalizer may be predetermined based on expected channel conditions or calibration measurements in lab conditions of the receiver.

In the embodiment shown in FIG. 2, the plurality of predetermined sets of coefficients comprises at least a first set of coefficients corresponding to a first rate and a second set of coefficients corresponding to a second rate, the first rate being lower than the second rate, and wherein, the first set of coefficients causes the equalizer to perform low-pass filtering, when equalizing the received signal with the equalizer based on the first set of coefficients.

In an example, the first rate may be 25G, while the second rate may be 50G. In other example, there may be more than two possible rates for the received signal, for example 12.5G may be additionally possible. A skilled person should understand, for each possible rate there is a corresponding set of predetermined coefficients.

Specifically, in one example, the first set of coefficients causes the equalizer to perform averaging of the current and the previous sample, for example, to perform the delay-and-add filtering, when equalizing the received signal with the equalizer based on the first set of coefficients.

In an embodiment, the first set of coefficients causes the equalizer to average two or more consecutive samples in the received signal, when equalizing the received signal with the equalizer based on the first set of coefficients.

When receiving a 25G NRZ signal with a 50G Rx chain, a benefit can be obtained by averaging the 2 samples from one 25G symbol. By averaging, the noise is averaged and thus lowered. Thus, more improvement in performance can be obtained.

In an example, a simple way to realize the averaging may be implemented by configuring pairs of equal coefficients for the equalizer, for example a Feed-Forward Equalizer (FFE). For instance, for a 50G equalizer, 25G-averaging could be realized by setting the middle two coefficients (for 12.5G the 4 middle coefficients) equal to each other, and the others equal to zero: [ . . . 0 0 ½ ½ 0 0 . . . ].

More generally, the coefficients of the equalizer can be set to perform a low-pass filtering. This can for instance be determined up front, for example during calibration in the lab before deployment in the field.

Simulation results show that the performance of using the fixed coefficients of equalizer for averaging two or more consecutive samples is very close to the performance of the theoretic optimal 25G equalizer. These fixed equalizers are predetermined and can be used without any online training time and thus has minimum complexity.

As shown in FIG. 2, the selected set of coefficients is provided to the equalizer. The apparatus 200 equalizes the received signal with the equalizer based on the selected set of coefficients, obtaining an equalized signal, to be provided to the output of the apparatus 200.

Specifically, the selected set of coefficients may be loaded to the equalizer during a time period determined based on the scheduling information.

For example, the timing of a switch in the rate of the received signal may be predicted or determined based on the scheduling information, either based on the downstream scheduling information for an implementation in an ONU or based on the burst scheduling information for an implementation in an OLT. The timing for switching the coefficients for the equalizer may be determined based on the timing of switch in the rate of the received signal. Accordingly, a pre-emptive switching for the equalizer may be realized.

In one embodiment, when the apparatus 200 is implemented in an OLT, for example in a multi-rate burst-mode scenario, the rate of an incoming burst may be determined based on the burst scheduling information. The set of coefficients selected based on the determined rate of the coming burst may be loaded during the guard time before the incoming burst.

In another embodiment, when the apparatus 200 is implemented in an ONU, the selected set of coefficients may be loaded to the equalizer during a time period prior to the timing of a switch in the rate of the downstream signal is expected.

Specifically, the equalizer may be selected from: an FFE, a Decision Feedback Equalizer, DFE, and a Maximum Likelihood Sequence Estimation, MLSE, equalizer. The equalizer may also be implemented as a cascade of multiple equalizer structures, for instance multiple FFE equalizers, or a FFE followed by a MLSE.

Specifically, in an embodiment, the equalizing may be further based on adaptive training.

In an example, the selected set of coefficients may be used as initial value of coefficients for use by the equalizer. During operation, the coefficients for use by the equalizer may be adjusted based on adaptive training. Approaches for fine-tuning of the coefficients for use by the equalizer are known to a skilled person and will not be elaborated here.

For example, upon determining the rate of the received signal is 50G, the second set of coefficients corresponding to the second rate may be selected and provided to the equalizer. Equalization may be performed based on adaptive training using the selected second set of coefficients as initial coefficients.

In one embodiment, at least one of the plurality of predetermined sets of coefficients may be predetermined based on adaptive training.

Specifically, the selected set of coefficients maybe updated during operation based on adaptive training. The updated set of coefficients may be stored and used later as predetermined set of coefficients corresponding to the determined rate.

The advantage of various embodiments is that the equalizer coefficients are selected based on determined rate of the received signal, the same equalizer structure (or part of it) may be kept for different rates of reception. A dynamic switch in equalizer coefficients can be realized upon rate switching. There is no need to wait until the equalizer coefficients are re-trained before valid reception can start. While the performance, like Bit Error Rate (BER), of the received signals with different rates can be improved.

Further referring to FIG. 2, as indicated by the dashed arrow, the first set of coefficients may be optionally predetermined based on the second set of coefficients. Alternatively, the second set of coefficients may be optionally predetermined based on the first set of coefficients.

For example, 25G equalizer coefficients could be determined based on the 50G coefficients. For instance, if a signal y(k) is received, which is then equalized by an FFE equalizer with coefficients w(l) for l=0 to L−1 to an equalized signal z(k), then averaging two subsequent equalized samples leads to:

$$\frac{z(k)+z(k-1)}{2} = \frac{\Sigma_{l=0}^{L-1} y(k-l)w(l) + \Sigma_{l=0}^{L-1} y(k-l-1)w(l)}{2} = y(k)\frac{w(0)}{2} + \sum_{l=1}^{L-1} y(k-l)\frac{[w(l)+w(l-1)]}{2} + y(k-L)\frac{w(L-1)}{2}$$

Hence replacing the coefficients by w'(l)=(w(l)+w(l−1))/2 for l>0, or in other words averaging every two consecutive equalizer coefficients, and w'(0)=w(0)/2, causes that the equalized signal z[k] will contain an averaged equalized signal, ignoring sample y(k−L). Every second sample, as aligned with the 25G symbols, will then give an improved 25G signal with lower noise.

This relation can for instance be used to calculate first set of coefficients from the second set of coefficients. The inverse relation might also be used to do the inverse conversion.

The calculation of the first set of coefficients from the second set of coefficients (or vice versa) can also be realized in different ways. For instance, by taking the spectrum of the 50G equalizer coefficients, and downsampling it and then going back to the time domain.

Similar methods can be applied in case of a DFE, or even in case of a MLSE which is combined with a channel shortening FFE to calculate branch metrics. For instance, for a 50G DFE, 25G-averaging could be realized by setting the middle two feed-forward coefficients (for 12.5G the 4 middle coefficients) equal to each other, and the other feed-forward coefficients equal to zero: [ . . . 0 0 ½ ½ 0 0 . . . ], while the feedback coefficients are set to 0. Here the feedback filter is effectively bypassed. An alternative 25G DFE implementation could be based on the 50G coefficients. For example, the feed-forward coefficients could be determined by averaging every two consecutive coefficients as described above, and the feedback coefficients could similarly be determined by averaging every two consecutive feedback coefficients. This could potentially be combined with changing the amount of delay used in the feedback delay lines.

Similar techniques could also be applied to switch from a 50G equalizer to an equalizer for a signal with different signal content, i.e., with a different distribution of transitions/bit sequences, for instance a 25G Miller (i.e., delay-encoded) signal.

When the equalizer is used to process the 25G signal, it may still process samples at 50G rate, for instance process 2 samples per 25G symbol. These processed samples should be at some point be downsampled to samples at 25G rate, i.e., to one sample per symbol. This may be in the equalizer itself, or after the equalizer, for instance in the higher layer processing.

Figure 3:
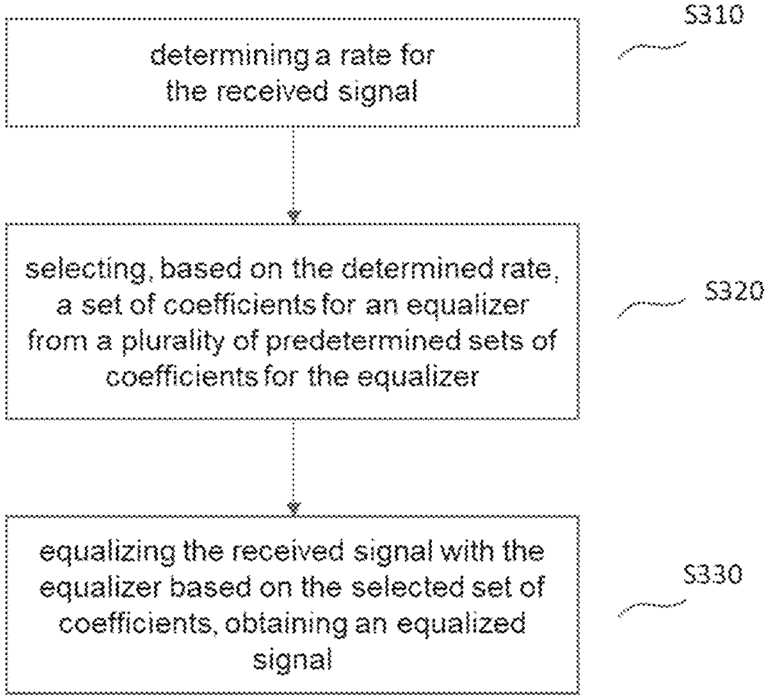
FIG. 3 shows a block diagram of a method according to various embodiments.

FIG. 3 shows a block diagram of a method according to various embodiments.

The method may be implemented at an OLT or an ONU in a PON, for example at the OLT 110, or at any one of the ONUs, for example, ONU 131, 132, . . . , 133 in FIG. 1.

The method starts at step S310 with determining a rate for a received signal in a PON.

At step S320, the method continues with selecting, based on the determined rate, a set of coefficients for an equalizer from a plurality of predetermined sets of coefficients for the equalizer, wherein, the plurality of predetermined sets respectively corresponds to a plurality of rates.

At step S330, the method continues with equalizing the received signal with the equalizer based on the selected set of coefficients, obtaining an equalized signal.

Figure 4:
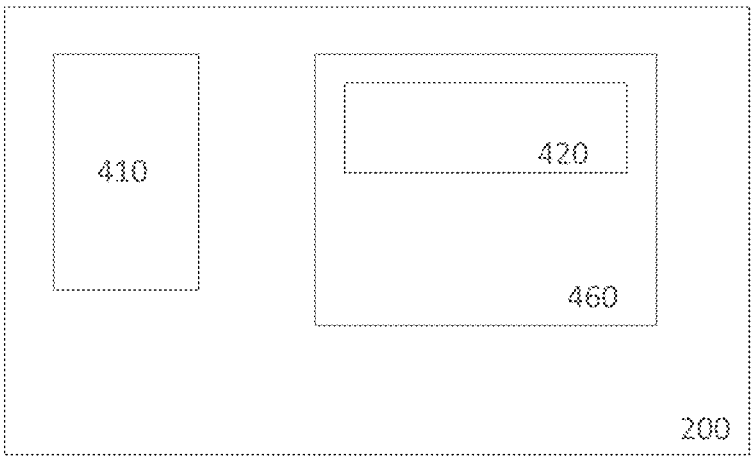
FIG. 4 shows a block diagram of an apparatus according to various embodiments.

FIG. 4 shows a block diagram of an apparatus according to various embodiments.

The apparatus 200 operating in accordance with an example embodiment may be implemented at an OLT or an ONU in a PON, for example at the OLT 110, or at any one of the ONUs, for example, ONU 131, 132, . . . , 133 in FIG. 1. The apparatus 200 may be implemented as an electronic device such as a chip, chip-set, an electronic device or an access network controller. The apparatus 200 includes a processor 410 and a memory 460. In other examples, the apparatus 200 may comprise multiple processors.

In the example of FIG. 8, the processor 410 is a control unit operatively connected to read from and write to the memory 460. The processor 410 may also be configured to receive control signals received via an input interface and/or the processor 410 may be configured to output control signals via an output interface. In an example embodiment the processor 410 may be configured to convert the received control signals into appropriate commands for controlling functionalities of the apparatus 200.

The memory 460 stores computer program instructions 420 which when loaded into the processor 410 control the operation of the apparatus 200 as explained above. In other examples, the apparatus 200 may comprise more than one memory 460 or different kinds of storage devices.

Computer program instructions 420 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises means, wherein the means comprises at least one processor 410, at least one memory 460 including computer program code 420, the at least one memory 460 and the computer program code 420 configured to, with the at least one processor 410, cause the performance of the apparatus 200.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:

at least one memory configured to store instructions; and at least one processor configured to execute the instructions and cause the apparatus to perform, determining a rate for a received signal in a passive optical network;

selecting, based on the determined rate, a set of coefficients for an equalizer from a plurality of predetermined sets of coefficients for the equalizer, wherein, the plurality of predetermined sets respectively corresponds to a plurality of rates;

equalizing the received signal with the equalizer based on the selected set of coefficients to obtain an equalized signal.

2. The apparatus according to claim 1, wherein the equalizing is further based on adaptive training.

3. The apparatus according to claim 1, wherein the apparatus is further caused to perform, predetermining at least one of the plurality of predetermined sets of coefficients based on adaptive training.

4. The apparatus according to claim 1, wherein the plurality of predetermined sets of coefficients comprises at least a first set of coefficients corresponding to a first rate and a second set of coefficients corresponding to a second rate, the first rate being lower than the second rate, and wherein, the first set of coefficients causes the equalizer to perform low-pass filtering, when equalizing the received signal with the equalizer based on the first set of coefficients.

5. The apparatus according to claim 4, wherein the apparatus is further caused to perform, predetermining the first set of coefficients based on the second set of coefficients; or predetermining the second set of coefficients based on the first set of coefficients.

6. The apparatus according to claim 4, wherein the first set of coefficients causes the equalizer to average two or more consecutive samples in the received signal, when equalizing the received signal with the equalizer based on the first set of coefficients.

7. The apparatus according to claim 1, wherein, the apparatus is implemented in an Optical Line Terminal or in an Optical Network Unit.

8. The apparatus according to claim 1, wherein the equalizer is selected from:

a Feed-Forward Equalizer, FFE, a Decision Feedback Equalizer, DFE, and a Maximum Likelihood Sequence Estimation, MLSE, equalizer.

9. The apparatus according to claim 1, wherein the rate for the received signal is determined based on a scheduling information.

10. The apparatus according to claim 9, wherein the apparatus is further caused to perform, loading the selected set of coefficients to the equalizer during a time period determined based on the scheduling information.

11. The apparatus according to claim 1, wherein the apparatus is implemented in an Optical Line Terminal, and the received signal is a burst from an Optical Network Unit communicatively connected to the Optical Line Terminal and wherein, the rate of the received signal is determined based on a burst scheduling information.

12. The apparatus according to claim 1, wherein the apparatus is implemented in an Optical Network Unit, and wherein, the rate of the received signal is determined based on a downstream scheduling information.

13. The apparatus according to claim 12, wherein the apparatus is further caused to perform, obtaining the downstream scheduling information from an Optical Line Terminal communicatively connected to an Optical Network Unit.

14. A method, comprising:

determining a rate for a received signal in a passive optical network;

selecting, based on the determined rate, a set of coefficients for an equalizer from a plurality of predetermined sets of coefficients for the equalizer, wherein, the plurality of predetermined sets respectively corresponds to a plurality of rates; and equalizing the received signal with the equalizer based on the selected set of coefficients to obtain an equalized signal.

15. A non-transitory computer-readable medium storing instruction, which when executed by a processor, cause an apparatus including the processor to perform, determining a rate for a received signal in a passive optical network;

selecting, based on the determined rate, a set of coefficients for an equalizer from a plurality of predetermined sets of coefficients for the equalizer, wherein, the plurality of predetermined sets respectively corresponds to a plurality of rates; and equalizing the received signal with the equalizer based on the selected set of coefficients to obtain an equalized signal.

* * * * *